US012598573B2

(12) United States Patent
Mansour et al.

(10) Patent No.: US 12,598,573 B2
(45) Date of Patent: Apr. 7, 2026

(54) ENHANCED MULTI-SATELLITE DOWNLINK CONNECTIVITY

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 636 days.

(21) Appl. No.: 17/962,899

(22) Filed: Oct. 10, 2022

(65) Prior Publication Data

US 2024/0121743 A1 Apr. 11, 2024

(51) Int. Cl.
| | |
|---|---|
| *H04W 60/04* | (2009.01) |
| *H04W 24/10* | (2009.01) |
| *H04W 84/06* | (2009.01) |

(52) U.S. Cl.
CPC ........... *H04W 60/04* (2013.01); *H04W 24/10* (2013.01); *H04W 84/06* (2013.01)

(58) Field of Classification Search
CPC ........... H04W 52/0216; H04W 52/241; H04W 64/00; H04W 16/14; H04W 60/04; H04W 56/0015
USPC ........ 455/13.1, 447; 370/328, 335, 379, 453
See application file for complete search history.

(56) References Cited

U.S. PATENT DOCUMENTS

| | | | | |
|---|---|---|---|---|
| 5,710,754 A * | 1/1998 | Kaku | .................. | H04L 27/3483 |
| | | | | 370/207 |
| 7,558,226 B2 * | 7/2009 | Anderson | ......... | H04W 52/0216 |
| | | | | 370/328 |

| | | | | |
|---|---|---|---|---|
| 8,965,393 B2 * | 2/2015 | Bhattacharya | ........ | H04W 64/00 |
| | | | | 342/453 |
| 9,363,712 B2 * | 6/2016 | Chuberre | ........... | H04B 7/18515 |
| 11,121,765 B2 * | 9/2021 | Kim | ..................... | H04B 17/382 |
| 2003/0103479 A1 * | 6/2003 | Anderson | ......... | H04W 52/0216 |
| | | | | 370/335 |

(Continued)

FOREIGN PATENT DOCUMENTS

| | | | | |
|---|---|---|---|---|
| EP | 2698932 A2 * | 2/2014 | ......... | H04W 72/542 |
| EP | 2884688 A1 * | 6/2015 | ............. | H04L 69/40 |

(Continued)

OTHER PUBLICATIONS

G. Ku and J. M. Walsh, "Resource Allocation and Link Adaptation in LTE and LTE Advanced: A Tutorial," in IEEE Communications Surveys & Tutorials, vol. 17, No. 3, pp. 1605-1633, thirdquarter 2015, doi: 10.1109/COMST.2014.238369 (Year: 2015).*

*Primary Examiner* — William D Cumming
(74) *Attorney, Agent, or Firm* — SHOOK, HARDY & BACON L.L.P.

(57) ABSTRACT

Embodiments of the present disclosure are directed to systems and methods for enhanced multi-satellite downlink connectivity. Each of two or more extraterrestrial base stations communicate data in a downlink to a single user equipment (UE). Encoding each downlink with a different and orthogonal code permits the re-use of at least partially overlapping frequency resources without intra-channel interference. The separated data streams can be used either to provide additional redundancy when the same data is communicated on each stream or to increase throughput when at least partially different data is communicated on each stream.

17 Claims, 3 Drawing Sheets

(56)    References Cited

U.S. PATENT DOCUMENTS

| | | | | |
|---|---|---|---|---|
| 2005/0164701 | A1* | 7/2005 | Karabinis | H04B 7/18563 |
| | | | | 455/447 |
| 2014/0064265 | A1* | 3/2014 | Gheoghiu | H04W 56/0015 |
| | | | | 370/350 |
| 2015/0133122 | A1* | 5/2015 | Chen | H04L 69/40 |
| | | | | 455/436 |
| 2015/0358861 | A1* | 12/2015 | Chuberre | H04B 7/18515 |
| | | | | 455/13.1 |
| 2020/0153500 | A1* | 5/2020 | Kim | H04B 17/318 |
| 2023/0199509 | A1* | 6/2023 | Liu | H04W 16/14 |
| | | | | 370/329 |
| 2024/0121743 | A1* | 4/2024 | Mansour | H04W 60/04 |
| 2024/0195493 | A1* | 6/2024 | Medarametla Lakshmi | |
| | | | | H04B 17/318 |
| 2024/0381107 | A1* | 11/2024 | Mansour | H04W 52/241 |

FOREIGN PATENT DOCUMENTS

| | | | | | |
|---|---|---|---|---|---|
| KR | 20130138322 | A | * | 12/2013 | H04W 68/02 |
| KR | 101598263 | B1 | * | 2/2016 | H04W 48/16 |
| WO | WO-2012137402 | A1 | * | 10/2012 | H04W 76/18 |
| WO | WO-2015044770 | A2 | * | 4/2015 | H04W 76/28 |
| WO | WO-2019215288 | A1 | * | 11/2019 | H04B 17/345 |

* cited by examiner

300

DETERMINE UE CAN BE
CONNECTED TO TWO ET BASE
STATION          310

DIVIDE DOWNLINK DATA BETWEEN
THE TWO ET BASE STATION          320

COMMUNICATE BOTH DATA
STREAMS TO UE          330

ENHANCED MULTI-SATELLITE DOWNLINK CONNECTIVITY

SUMMARY

The present disclosure is directed to improving downlink connectivity between a single user equipment (UE) and multiple satellites, substantially as shown and/or described in connection with at least one of the Figures, and as set forth more completely in the claims.

According to various aspects of the technology, downlink signals may be transmitted from multiple satellites to a single UE to increase the overall performance of the UE. Until very recently, the construction and deployment of extraterrestrial (e.g., satellite) base station constellations has been prohibitively costly, in terms of both time and money. Advances in satellite and rocket launching technologies are likely to create new opportunities for multi-satellite connectivity to UEs. Traditionally, restrictions on the number of deployed extraterrestrial base stations has meant that even if a UE could connect to an extraterrestrial base station, it was sufficient that downlink messaging was handled by a single base station. By connecting to multiple extraterrestrial base stations, the downlink quality and/or throughput to a single UE can be improved.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
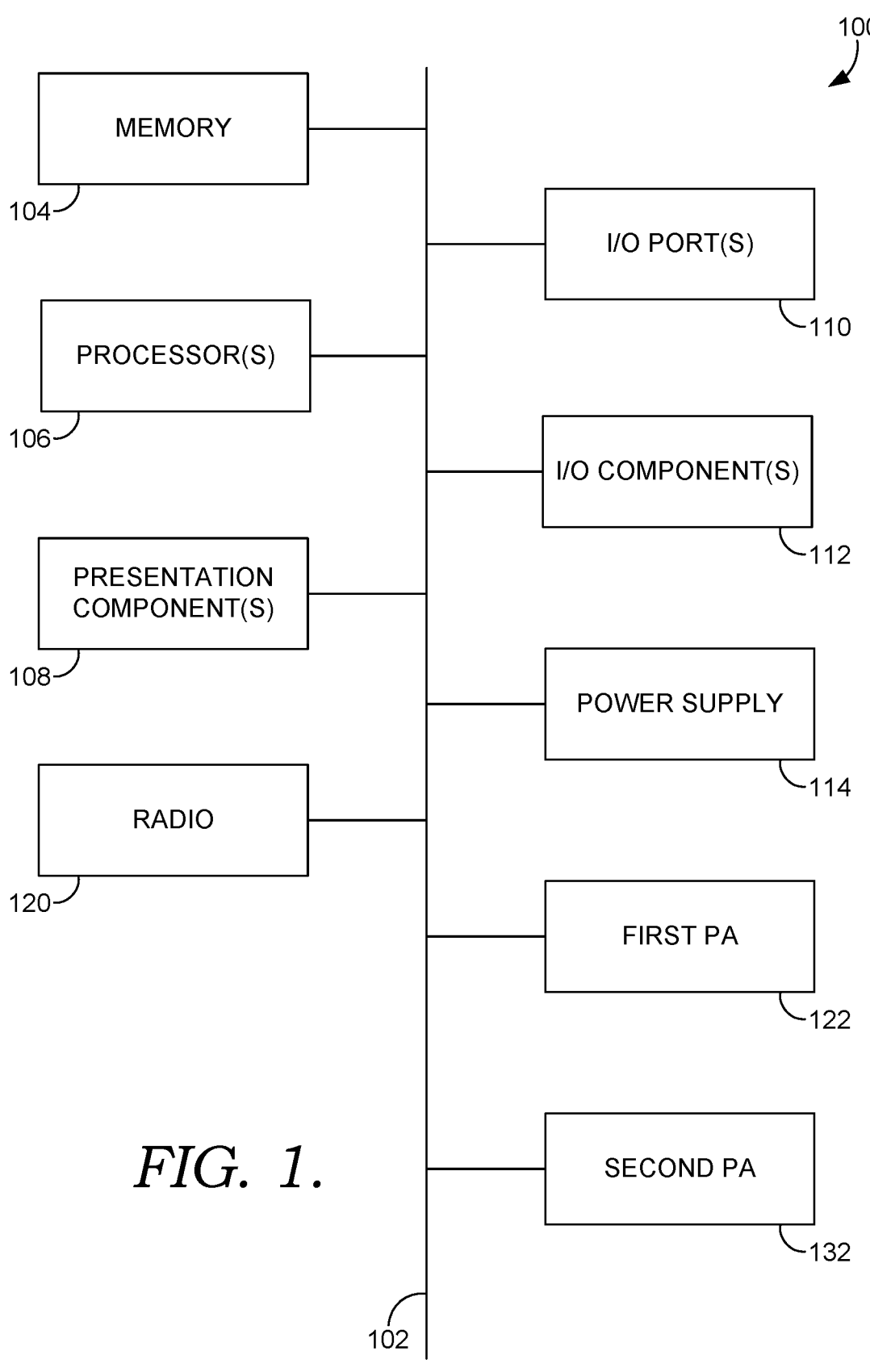
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, an extraterrestrial base station is distinguished from a terrestrial base station on the basis of its lack of ground coupling; some examples of extraterrestrial base stations include airborne (e.g., on an aircraft or airship) and satellites (e.g., low earth orbit (LEO), medium earth orbit (MEO), and geostationary orbit (GEO)). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the provision of telecommunication services is moving beyond the surface of the earth at increasing speed. Network operators, once exclusively operating terrestrial base stations, will begin to operate extraterrestrial base stations themselves or utilize third parties to service their subscribers with additional reliability and availability. Because terrestrial base stations are, nearly by definition, immobile, traditional network operators have never needed to consider the problem of how to provide wireless service to a potentially-mobile UE from a mobile base station. Further, because the distances between terrestrial base stations and UEs are considerably shorter than the distance between an extraterrestrial base stations and UEs, special consideration must be given to ensuring integrity of service. Because the deployment of extraterrestrial base stations is cost-prohibitive, existing satellite telecommunication providers rarely, if ever, utilize spectrum resources from two distinct base stations (i.e., two different satellites) to serve a single UE.

In order to provide enhanced connectivity to a UE from two or more extraterrestrial base stations, the present disclosure is directed to systems, methods, and computer readable media for an enhanced multi-satellite connectivity paradigm. Each of two or more extraterrestrial base stations establish a downlink connection to a UE and can utilize that downlink connection in various ways that provide enhanced connectivity to the UE. In a high-fidelity mode, the same data may be communicated from a first extraterrestrial base station in a first encoded (e.g., spread spectrum code, chipping code, or any other coding scheme for use with code division multiplexing) stream and a second extraterrestrial base station in a second encoded stream, wherein the first and second streams are encoded with different codes. Though each extraterrestrial base station may utilize the same frequencies to communicate with the UE, the UE is capable of receiving both streams and decoding them in order to make sense of the data, significantly decreasing the effect of path loss or interruption that could be caused by corruption or degradation of either downlink, individually. In an additive mode, two different data streams may be communicated by the two different extraterrestrial base stations in order that greater overall throughput may be realized by the UE. In order for the multi-satellite connection with the UE to be created, certain threshold conditions, such as common relative movement of the extraterrestrial base stations and key performance indicator (KPI) thresholds may be required. Whether in high-fidelity or additive mode, the multi-satellite connection with the UE will enhance the overall connection characteristics between the UE and the broader telecommunication network.

Accordingly, a first aspect of the present disclosure is directed to a system for communicating with a user equipment (UE) from two or more extraterrestrial base stations comprising a first extraterrestrial base station a second extraterrestrial base station, and one or more computer processing components. The one or more computer processing components are configured to perform a method comprising communicating a first set of signals from the first extraterrestrial base station to the UE encoded with a first code and using a first frequency band. The one or more computer processing components are further configured to communicate.

A second aspect of the present disclosure is directed to a method for communicating with a user equipment (UE) from two or more extraterrestrial base stations comprising. The method comprises communicating a first set of signals from a first extraterrestrial base station to the UE encoded with a first code and using a first frequency band. The method further comprises communicating a second set of signals from a second extraterrestrial base station to the UE encoded with a second code and using a second frequency band, wherein the first frequency band at least partially overlaps with the second frequency band, wherein each of the first extraterrestrial base station and the second extraterrestrial base station are attached to a UE at a common time and at least a portion of the first set of signals and the second set of signals are communicated to the UE at the common time.

According to another aspect of the technology described herein, a method for a user equipment (UE) to communicate with a plurality of extraterrestrial base stations is presented. The method comprises attaching to a first extraterrestrial base station based on a determination that one or more key performance indicators exceeds a first predetermined threshold. The method further comprises attaching to a second extraterrestrial base station based on a determination that the one or more key performance indicators exceeds a second predetermined threshold. The method further comprises receiving a first set of signals from the first extraterrestrial base station on a first frequency band. The method further comprises receiving a second set of signals from the second extraterrestrial base station on a second frequency band. The method further comprises decoding the first set of signals using a first code. The method further comprises decoding the second set of signals using a second code, wherein the first code is different than the second code.

In another aspect of the present disclosure, a system is provided for enhanced multi-satellite connectivity. The system includes one or more receivers, and one or more computer processing components configured to perform a method enhanced communication with a plurality of extraterrestrial base stations. The method comprises attaching to a first extraterrestrial base station based on a determination that one or more key performance indicators exceeds a first predetermined threshold. The method further comprises attaching to a second extraterrestrial base station based on a determination that the one or more key performance indicators exceeds a second predetermined threshold. The method further comprises receiving a first set of signals from the first extraterrestrial base station on a first frequency band. The method further comprises receiving a second set of signals from the second extraterrestrial base station on a second frequency band. The method further comprises decoding the first set of signals using a first code. The method further comprises decoding the second set of signals using a second code, wherein the first code is different than the second code.

Another aspect of the present disclosure is directed to one or more non-transitory computer readable media that, when executed by one or more computer processing components, cause the one or more computer processing components to execute a method for enhance multi-satellite downlink connectivity. The method comprises attaching to a first extraterrestrial base station based on a determination that one or more key performance indicators exceeds a first predetermined threshold. The method further comprises attaching to a second extraterrestrial base station based on a determination that the one or more key performance indicators exceeds a second predetermined threshold. The method further comprises receiving a first set of signals from the first extraterrestrial base station on a first frequency band. The method further comprises receiving a second set of signals from the second extraterrestrial base station on a second frequency band. The method further comprises decoding the first set of signals using a first code. The method further comprises decoding the second set of signals using a second code, wherein the first code is different than the second code.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
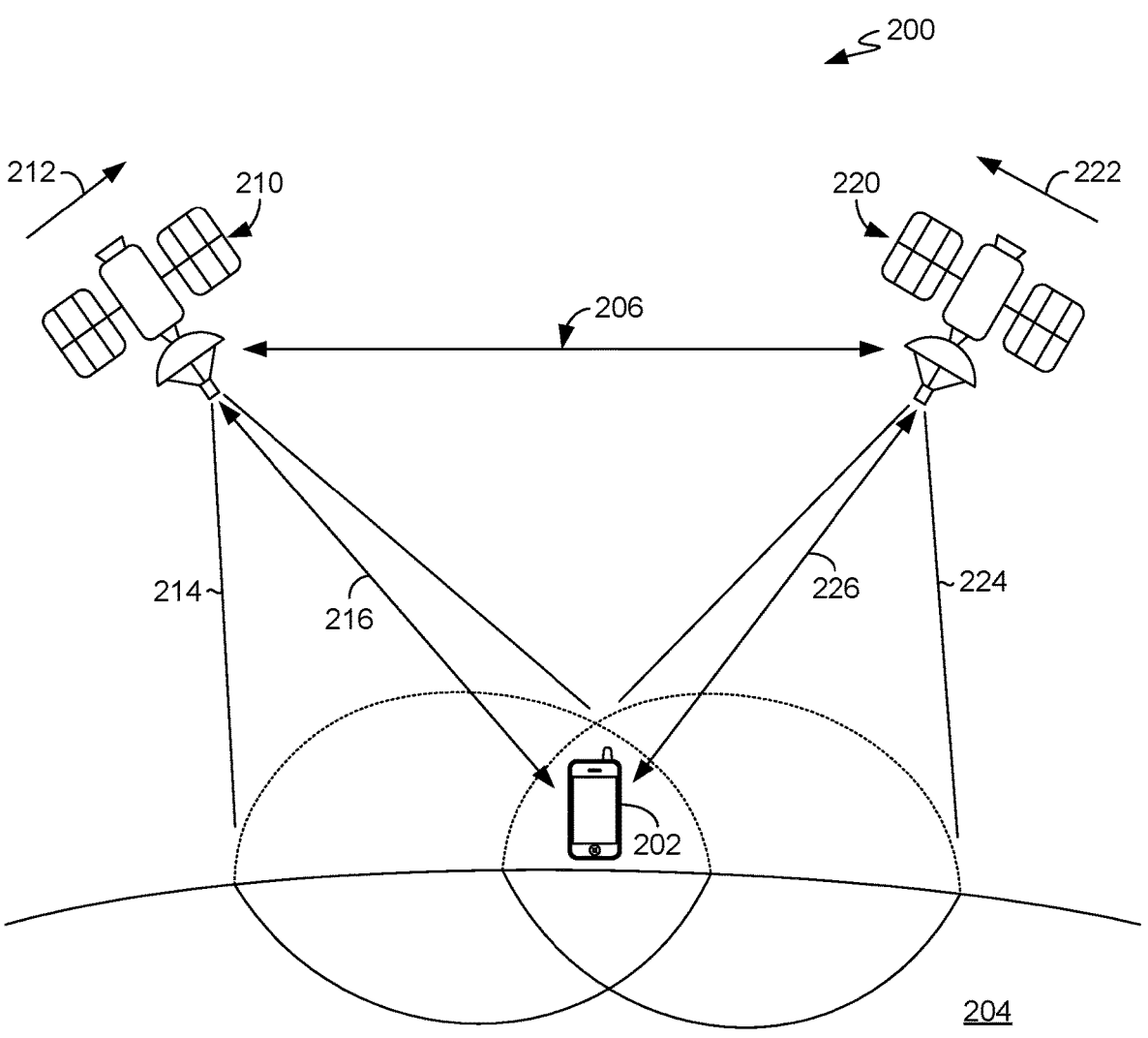
FIG. 2 illustrates a diagram of an exemplary environment in which implementations of the present disclosure may be employed.

Turning now to FIG. 2, an exemplary network environment is illustrated in which implementations of the present disclosure may be employed. Such a network environment is illustrated and designated generally as network environment 200. At a high level the network environment 200 comprises a UE 202 that is at or near ground level of the earth 204, and two or more extraterrestrial base stations, represented in FIG. 2 as a first extraterrestrial base station 210 and a second extraterrestrial base station 220. Though each of the first extraterrestrial base station 210 and the second extraterrestrial base station 220 are illustrated as being satellites, it should be understood that the present disclosure is not limited to space-based implementations; either or both of the first extraterrestrial base station 210 and the second extraterrestrial base station 220 may be in the form of an aircraft or any other non-terrestrial base station. Similarly, though the UE 202 is illustrated as a cellular phone, the UE 202 may be any computing device described with respect to FIG. 1.

Each of the first extraterrestrial base station 210 and the second extraterrestrial base station 220 are configured to wirelessly communicate with the UE 202. In aspects, each of the extraterrestrial base stations may communicate with the UE using any wireless telecommunication protocol desired by a network operator, including but not limited to 3G, 4G, 5G, 6G, 802.11x and the like. Each of the first extraterrestrial base station 210 and the second extraterrestrial base station 220 may establish a wireless connection with the UE 202; the first extraterrestrial base station 210 may communicate with the UE 202 using a first wireless link 216 and the second extraterrestrial base station 220 may communicate with the UE 202 using a second wireless link 226. Though illustrated as a two-way communication link, either or both of the first wireless link 216 and the second wireless link 226 may be one-way (i.e., downlink only) instead of bi-directional (i.e., downlink and uplink). Each of the first extraterrestrial base station 210 and the extraterrestrial base station may be said to provide telecommunication coverage to a geographic area; as illustrated in FIG. 2, the first extraterrestrial base station 210 may be said to serve a first geographic coverage area 214 and the second extraterrestrial base station 220 may be said to serve a second geographic coverage area 224. Further, FIG. 2 illustrates that each of the first extraterrestrial base station 210 and the second extraterrestrial base station 220 are in motion relative to the UE 202; that is, the first extraterrestrial base station 210 may be said to moving along a first track 212 and the second extraterrestrial base station 220 may be said to be moving along a second track 222. Despite the illustrated embodiment, in some aspects of the present disclosure, either or both of the first extraterrestrial base station 210 and the second extraterrestrial base station 220 may be stationary with respect to a point on the earth 204 (i.e., the extraterrestrial base station may be in a GEO orbit). In addition to the connection between the extraterrestrial base stations and the UE 202, in some aspects of the present disclosure, the first extraterrestrial base station 210 may be communicatively coupled, via a direct connection link 206, to the second extraterrestrial base station 220; in other aspects, the first extraterrestrial base station 210 may be communicatively coupled to the second extraterrestrial base station 220 via one or more ground stations (not illustrated so as not to obscure other portions of the invention).

In instances where the UE 202 is in both the first geographic coverage area 214 and the second geographic coverage area 224, the UE 202 may be able to connect to both the first extraterrestrial base station 210 and the second extraterrestrial base station 220. The presence of the UE 202 within an overlap of the first geographic coverage area 214 and the second geographic coverage area 224 may be determined based on one or more key performance indicators (KPIs) exceeding a predetermined threshold (e.g. reference signal receive power (RSRP), path loss, reference signal receive quality (RSRQ), signal to interference noise ratio (SINR), distance between the UE 202 and the relevant extraterrestrial base station, and the like). In one aspect of the present disclosure, a standard threshold for attachment to a second extraterrestrial base station may be reduced based on a determination that the UE 202 is already attached to (or is capable of attaching to) a first extraterrestrial base station; in other words, if a standard threshold KPI for attaching to extraterrestrial base stations is a RSRP of −90 dbm, and if the UE 202 measures the RSRP of the first wireless communication link 216 as greater than −90 dBm, then the standard threshold for attaching to the second extraterrestrial base station 220 may be lowered to a lower threshold (e.g., −93 dBm, −96 dBm, −100 dBm). Though lowering the KPI threshold for attachment to the second extraterrestrial base station 220 may result in potentially negative effects (e.g., dropped packets), features of the present disclosure mitigate the impacts by communicating two data streams to the UE 202. In addition to determining that the UE 202 is within an overlap of the first geographic coverage area 214 and the second geographic service area 224, aspects of the present disclosure additionally may consider whether the first extraterrestrial base station 210 and the second extraterrestrial base station 220 are moving in a sufficiently similar direction, relative to the UE 202; for example, in order to avoid the deleterious effects of opposing Doppler effects, the first track 212 may be required to be within a predetermined threshold angle of the second track 222 (e.g., 90 degrees or 180 degrees). In the set of circumstances illustrated in FIG. 2, the first track 212 may be said to be moving at +45 degrees relative to the UE 202 and the second track 222 may be said to be moving at −45 degrees relative to the UE 202, creating an angular delta of 90 degrees. In aspects, one or more computer processing components (e.g., on board the first extraterrestrial base station 210, on board the second extraterrestrial base station 220, at the UE 202, and/or at a networked location of a wireless telecommunication network operator) may determine the first track 212 and the second track 222 based on a measurement of a Doppler effect, a change in downlink signal strength (i.e., consistent increases of signal strength at the UE 202 is a strong indication an extraterrestrial base station is getting nearer to the UE 202.

Once it has been determined that the UE 202 is attached (or is capable of attaching) to both the first extraterrestrial base station 210 and the second extraterrestrial base station 220, either a high-fidelity or high-throughput arrangement may be implemented. In the high-fidelity arrangement, each of the first extraterrestrial base station 210 and the second extraterrestrial base station 220 communicate the same data stream to the UE 202. In aspects of the high-fidelity arrangement wherein a first range of frequencies used in the first communication link 216 and a second range of frequencies used in the second communication link 226 at least partially overlap, then a first data stream communicated by the first extraterrestrial base station 210 along the first communication link 216 may be encoded using a first code and a second data stream communicated by the second extraterrestrial base station 220 along the second communication link 226 may be encoded using a second code, the first code being different than the second code. Using different codes, especially in instances where the first and second communication links 216, 226 at least partially overlap, permits the UE 202 to receive both data streams and decode them without intra-channel interference. Once the UE 202 has received each of the first data stream from the first extraterrestrial base station 210 and the second data stream from the second extraterrestrial base station 220, the UE 202 may coherently sum the redundant data streams in order to leverage the benefit of spatial diversity and have a high-fidelity connection, wherein dropped or miscommunicated packets on either individual communication link are less likely to corrupt the overall connection. Alternatively to the high-fidelity arrangement, the use of two or more extraterrestrial base stations may be used to increase the overall throughput for the UE 202, wherein the first data stream communicated by the first extraterrestrial base station 210 along the first wireless communication link 216 is at least partially different than the second data stream communicated by the second extraterrestrial base station 220 along the second wireless communication link 226. If desirable by a particular network operator, the UE 202 may switch between the high-fidelity and the high-throughput arrangements; for example, an initial multi-satellite setup may be configured for the UE 202 to be in a high-throughput arrangement until such time that a packet drop rate, usable throughput, or other negative KPI exceeds a first predetermined threshold, at which point the UE 202 may be caused to switch to the high-fidelity arrangement. After a predetermined amount of time or upon realization that the quality of the connection with the first extraterrestrial base station 210 and/or the second extraterrestrial base station 220 exceeds a second predetermined threshold, the UE 202 may be caused to switch back to the high-throughput arrangement. A person having ordinary skill in the art would appreciate that an initial setup may alternatively be high-fidelity, then switch to high-throughput, and revert, if conditions warrant, to high-fidelity. In other instances, the high-fidelity arrangement may be a default arrangement until such time that it is determined that a greater than threshold amount of data is scheduled to be communicated to the UE 202, at which point the arrangement may be switched to high-throughput. Regardless of whether the first extraterrestrial base station 210 and the second extraterrestrial base station 220 are operating in a high-fidelity arrangement or a high-throughput arrangement, the first and second extraterrestrial base stations may coordinate scheduling of data streams directly between one another (using, for example a space-based corollary of the X2 interface), or coordination of the data streams to the UE 202 could be handled by a ground station with instructions communicated to the extraterrestrial base stations.

Figure 3:
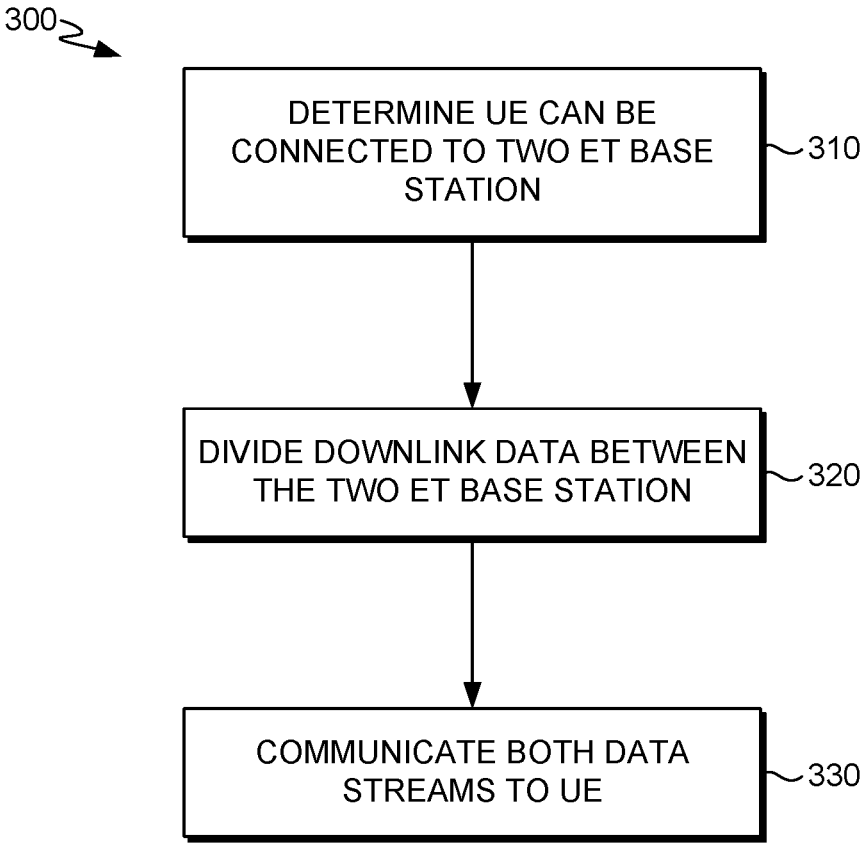
FIG. 3 depicts a flow diagram of an exemplary method for multi-satellite downlink connectivity, in accordance with embodiments described herein.

Turning now to FIG. 3, a flow chart is illustrated for a method of enhanced multi-satellite connectivity to a UE. At a first step 310, it is determined that a UE is attached (or can be attached) to each of a first extraterrestrial base station and a second extraterrestrial base station, according to any one or more aspects described with respect to FIG. 2. At a second step 320, an amount of data destined for a UE, such as the UE 202 of FIG. 2, is scheduled at each of a first extraterrestrial base station and a second extraterrestrial base station. According to any one or more aspects described with respect to FIG. 2, in a high-fidelity arrangement a first data stream scheduled at a first extraterrestrial base station may be the same as a second data stream scheduled at a second extraterrestrial base station, and in a high-throughput arrangement a first data stream scheduled at the first extraterrestrial base station may be at least partially different than a second data stream scheduled at the second extraterrestrial base station. At a third step 330, each of the two data streams are communicated from the first and second extraterrestrial base station to the UE. According to any or more aspects described with respect to FIG. 2, the first data stream and the second data stream may be communicated on at least partially overlapping frequency ranges by encoding each data stream with a different code (e.g., chipping code, spread spectrum code) that is also known by the UE, or may be communicated on non-overlapping frequency ranges with or without codes.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for communicating with a user equipment (UE) from two or more extraterrestrial base stations comprising:

a first extraterrestrial base station;

a second extraterrestrial base station; and one or more computer processing components configured to:

communicate a first set of signals from the first extraterrestrial base station to the UE encoded with a first code and using a first frequency band; and communicate a second set of signals from the second extraterrestrial base station to the UE encoded with a second code and using a second frequency band, wherein the first frequency band at least partially overlaps with the second frequency band.

2. The system of claim 1, wherein the first frequency comprises the second frequency band.

3. The system of claim 2, wherein the one or more computer processing components are further configured to determine that the first extraterrestrial base station is moving in a first direction and the second extraterrestrial base station is moving in a second direction, wherein the first direction is within a predetermined threshold angle of the second direction, relative to the UE.

4. The system of claim 3, wherein a first attachment threshold for the UE to attach to the first extraterrestrial base station is greater than a second attachment threshold for the UE to attach to the second extraterrestrial base station.

5. The system of claim 4, wherein the first extraterrestrial base station is configured to communicate with the second extraterrestrial base station to coordinate the communication of the first set of signal and the second set of signals.

6. The system of claim 3, wherein each of the first extraterrestrial base station and the second extraterrestrial base station are attached to the UE at a common time and at least a portion of the first set of signals and the second set of signals are communicated to the UE at the common time.

7. The system of claim 3, wherein based on said determination, the one or more computer processing components are further configured to divide an amount of data between the first set of signals and the second set of signals.

8. A method for communicating with a user equipment (UE) from two or more extraterrestrial base stations comprising:

communicating a first set of signals from a first extraterrestrial base station to the UE encoded with a first code and using a first frequency band; and communicating a second set of signals from a second extraterrestrial base station to the UE encoded with a second code and using a second frequency band, wherein the first frequency band at least partially overlaps with the second frequency band, wherein each of the first extraterrestrial base station and the second extraterrestrial base station are attached to a UE at a common time and at least a portion of the first set of signals and the second set of signals are communicated to the UE at the common time.

9. The system of claim 1, wherein a first attachment threshold for the UE to attach to the first extraterrestrial base station is greater than a second attachment threshold for the UE to attach to the second extraterrestrial base station.

10. The system of claim 1, wherein the first extraterrestrial base station is configured to communicate with the second extraterrestrial base station via a space-based interface to coordinate the communication of the first set of signals and the second set of signals.

11. The system of claim 1, wherein the first extraterrestrial base station and the second extraterrestrial base station are configured to communicate with a ground station to coordinate the communication of the first set of signals and the second set of signals.

12. The method of claim 8, wherein a first attachment threshold for the UE to attach to the first extraterrestrial base station is greater than a second attachment threshold for the UE to attach to the second extraterrestrial base station.

13. The method of claim 8, further comprising the first extraterrestrial base station communicating with the second extraterrestrial base station via a space-based interface to coordinate the communication of the first set of signals and the second set of signals.

14. The method of claim 8, further comprising the first extraterrestrial base station and the second extraterrestrial base station communicating with a ground station to coordinate the communication of the first set of signals and the second set of signals.

15. The system of claim 1, wherein the one or more computer processing components are further configured to determine that the first extraterrestrial base station is moving in a first direction and the second extraterrestrial base station is moving in a second direction, wherein the first direction is within a predetermined threshold angle of the second direction, relative to the UE.

16. The system of claim 1, wherein the one or more computer processing components are further configured to divide an amount of data between the first set of signals and the second set of signals based on a determination of movement directions of the first and second extraterrestrial base stations.

17. The method of claim 8, further comprising determining that the first extraterrestrial base station is moving in a first direction and the second extraterrestrial base station is moving in a second direction, wherein the first direction is within a predetermined threshold angle of the second direction, relative to the UE.

* * * * *